United States Patent [19]

Niwa et al.

[11] Patent Number: 5,689,583

[45] Date of Patent: Nov. 18, 1997

[54] CHARACTER RECOGNITION APPARATUS USING A KEYWORD

[75] Inventors: Hisao Niwa, Osaka; Kazuhiro Kayashima, Hirakata; Yasuharu Shimeki, Suita; Hidetsugu Maekawa, Kadoma, all of Japan

[73] Assignee: Matsushita Electric Industrial Co. Ltd., Osaka, Japan

[21] Appl. No.: 652,845

[22] Filed: May 23, 1996

Related U.S. Application Data

[63] Continuation of Ser. No. 295,351, Aug. 22, 1994, abandoned, which is a continuation of Ser. No. 9,013, Jan. 26, 1993, abandoned.

[30] Foreign Application Priority Data

Jan. 30, 1992 [JP] Japan ................................ 4-014611
Jun. 18, 1992 [JP] Japan ................................ 4-159842

[51] Int. Cl.[6] ........................................... G06K 9/00
[52] U.S. Cl. ................................................. 382/181
[58] Field of Search ............................ 382/173, 177, 382/161, 181, 224, 228, 229, 230

[56] References Cited

U.S. PATENT DOCUMENTS

| | | | |
|---|---|---|---|
| 4,674,065 | 6/1987 | Lange et al. | 382/40 |
| 4,754,489 | 6/1988 | Rokser | 382/40 |
| 5,133,023 | 7/1992 | Bokser | 382/40 |
| 5,161,245 | 11/1992 | Fenwick | 382/40 |

FOREIGN PATENT DOCUMENTS

| | | |
|---|---|---|
| 1201178 | 8/1970 | European Pat. Off. . |
| 2317889 | 4/1984 | Japan . |
| 3198180 | 8/1991 | Japan . |

OTHER PUBLICATIONS

"Post–Processing For Japanese Document Readers" by Fumihito Nishino et al., 1988, 166–169.

"A Review Of Segmentation And Contextual Analysis Techniques For Text Recognition" by D.G. Elliman, 1989, pp. 337–346.

Primary Examiner—Jose L. Couso
Attorney, Agent, or Firm—Beveridge, Degrandi, Weilacher & Young, LLP

[57] ABSTRACT

A character recognition unit recognizes a document image to output character candidates; a character correction unit selects a corrected character string which is correct with respect to grammar and vocabulary, from a set of character candidates from the character recognition unit; a keyword extraction unit extracts keywords of a document to be recognized, from the corrected character string; and wherein the character correction unit selects the corrected character string by a use of BUNSETSU evaluation representing correctness with respect to grammar and vocabulary, and an evaluation of the BUNSETSU is increased when the BUNSETSU has the keyword outputted from the keyword extraction unit.

7 Claims, 6 Drawing Sheets

Fig. 3

| | |
|---|---|
| original character string | 現場学習機能を |
| BUNSETSU candidates | 現場<br>現場学<br>　　字<br>　　学習<br>　　　　省機能を<br>　　　　　機能を<br>　　　　　　熊を |
| 1-pass recognition result | 現場学　省機能を |
| 2-pass recognition result | 現場 学習 機能を |

4,689,583

CHARACTER RECOGNITION APPARATUS USING A KEYWORD

This application is a continuation of application Ser. No. 08/295,351, filed Aug. 22, 1994, (now abandoned), which application was a continuation of application Ser. No. 08/009,013, filed Jan. 26, 1993, (abandoned), which applications are entirely incorporated herein by reference.

BACKGROUND OF THE INVENTION

1. Field of the Invention

The present invention relates to a character recognition apparatus for recognizing characters which appear in a document.

2. Related Art of the Invention

With the recent development of data base and text processing technology, there is an increasing demand for a character recognition systems which operate at a high speed and with a high recognition rate.

For example, a conventional character recognition apparatus has been discussed in, for example, Information Processing Society Thesis Journal, Vol. 30, No. 11, pp. 1394-1401. FIG. 6 shows the conventional character recognition apparatus.

A character recognition unit 1 recognizes characters in a document in order to output N character candidates for each character(character position(area)). A word extraction unit 3 obtains word candidates according to the character's position from the character candidates by the use of a word dictionary 4. A BUNSETSU extraction unit 6 selects BUNSETSU candidates according to the character's position from the word candidates by the use of a grammar dictionary 7. A BUNSETSU is a Japanese grammatical sentence part unit in Japanese language. It refers to a shortest phrase in Japanese language grammar. A BUNSETSU evaluation unit 9 evaluates the BUNSETSU candidates using a character's reliability evaluation from the character recognition unit 1, a word's frequency (of use), a word's length, and a character's length. BUNSETSU evaluation determines the reliability of a particular BUNSETSU candidate. A BUNSETSU selection unit 10 selects a BUNSETSU considered to be the most correct to obtain a correct(or corrected) character string 11. In the FIG. 6, 20 indicates a character correction unit comprising the word extraction unit 3, the word dictionary 4, the BUNSETSU extraction unit 6, the grammar dictionary 7, the BUNSETSU evaluation unit 9 and the BUNSETSU selection unit 10.

As mentioned above, the conventional apparatus, by the use of the word dictionary and the grammar dictionary, can obtain correct characters which are difficult to judge by only the character recognition unit 1, based on a knowledge of word and grammar.

However, in the above character recognition apparatus, the knowledge used for the correction of recognized characters outputted from the character recognition unit 1 is a general one of word and grammar. A document, however, has an inherent feature. For example, in a patent document, many words inherent in patent are entered. Thus, the style of a sentence and words used differ depending on the document content. In a conventional technique, the information inherent in a document has not been used for the correction of the recognized characters.

Further, in a conventional technique correct characters among N character candidates from the character recognition unit 1, but when there is no correct character in the N character candidates, the correction has been impossible.

The present invention intends to solve such conventional problems, thereby to improve character recognition rate.

SUMMARY

In order to attain the above object, the present invention processes once a document in a character correction unit to fetch a corrected character string. And a keyword extraction unit compares a word's frequency in the corrected character string with that in general sentences to extract keywords. Further, a calculating BUNSETSU evaluation unit in the character correction unit fetches the keyword information to calculate a BUNSETSU evaluation. Based on the BUNSETSU evaluation, a BUNSETSU selection unit selects a BUNSETSU to output a corrected character string.

Further, a keyword partial accord extraction unit extracts words in the corrected character string partially accordant with the extracted keywords. An adding word candidates unit sets a BUNSETSU evaluation to any partially accordant words and adds the words to word candidates. Based on the BUNSETSU evaluation, the BUNSETSU selection unit selects a BUNSETSU to output a more corrected character string.

BRIEF DESCRIPTION OF THE DRAWINGS

FIG. 3 is an output view experiment result showing an effect of an adding keyword weight unit according to the present invention.

PREFERRED EMBODIMENTS

The present invention will be described hereinafter based on drawings showing embodiments thereof.

Figure 1:
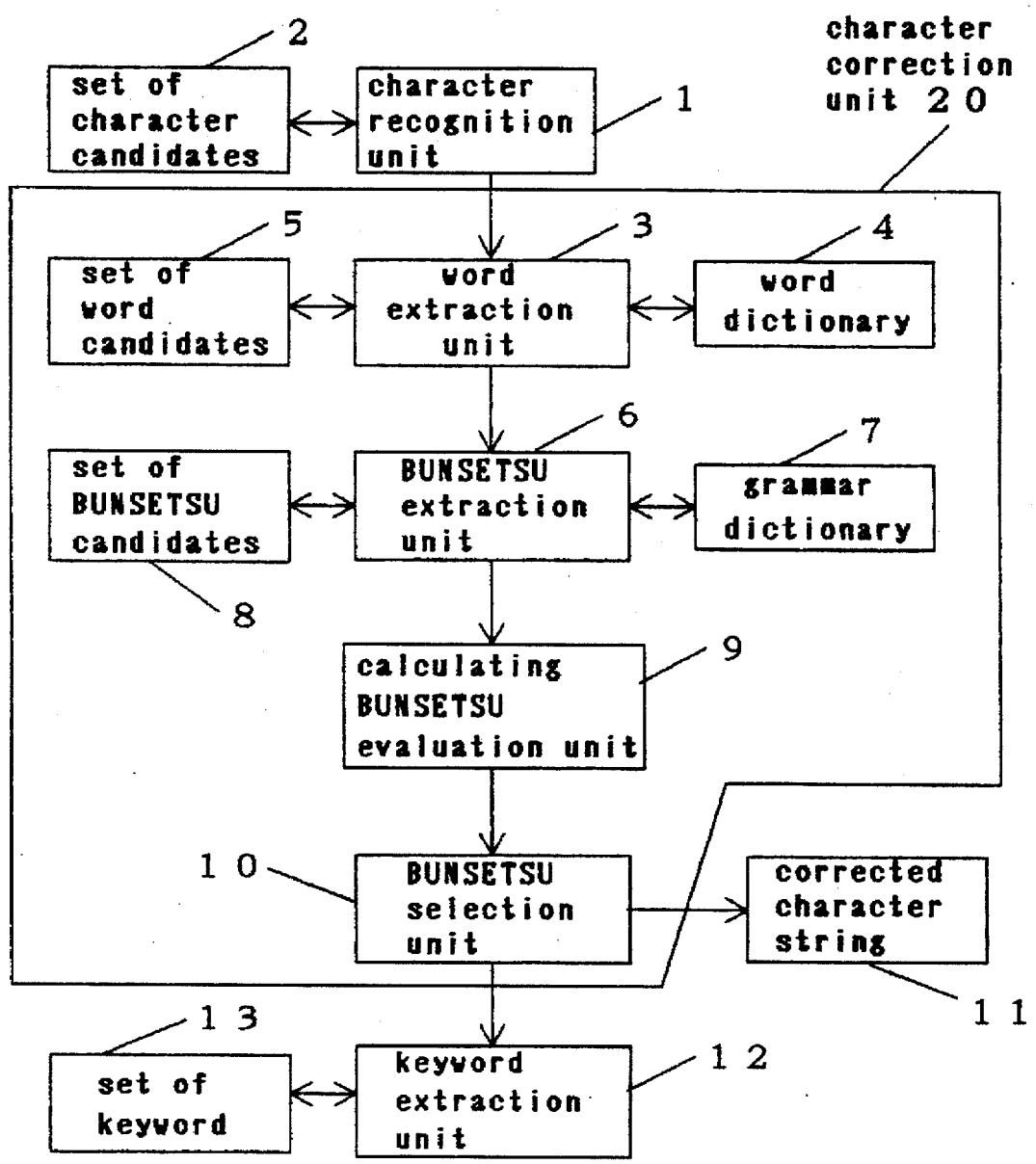
FIG. 1 is a block diagram of a character recognition apparatus of a first embodiment according to the present invention.

FIG. 1 is a block diagram of a character recognition apparatus, which is a first embodiment of the present invention. That is, the character recognition unit 1 recognizes characters in a document image to output a set of character candidates 2 having N character candidates from the first character candidate to the Nth character candidate per one character in a character string with a length "m".

The word extraction unit 3 selects word candidates accordant with words existing in the word dictionary 4 among a combination (character candidate string) of the set of character candidates 2, by querying the word dictionary 4 to prepare a set of word candidates 5. The BUNSETSU extraction unit 6 selects a BUNSETSU candidate which is a combination of words capable of becoming a BUNSETSU by referring to the grammar dictionary 7 to prepare a set of character candidates 8. The BUNSETSU evaluation unit 9 evaluates the contextual and grammatical correctness of the BUNSETSU extracted in the BUNSETSU extraction unit 6 based on a word's length and a word's frequency in the BUNSETSU to calculate its evaluation (Equation 1).

$$E = aE_a + bE_b + cE_c + dE_d \quad (1)$$

where $E_a$=output of character recognition unit 1 (character's reliability evaluation)
$E_b$=BUNSETSU's length
$E_c$=frequency of independent words included in BUNSETSU
$E_d$=word's length
a, b, c and d are constants.

The BUNSETSU selection unit 10 selects a BUNSETSU having a large evaluation among BUNSETSU candidates to prepare a corrected character string 11. The BUNSETSU evaluation in the corrected character string is taken as $E_i$ (i=1, B), provided that B is the number of BUNSETSUs in the entire document.

The keyword extraction unit 12 extracts keywords of a document to be recognized from the corrected character string 11 outputted from the BUNSETSU selection unit 10 to prepare a set of keywords 13. In extracting the keywords, the unit 12 uses information on the BUNSETSU evaluation in the corrected character string and on a general frequency of a word. For example, the keyword evaluation $K_w$ (possibility to become a key word) of a word "w" can be determined by Equation 2. Then the keyword is extracted by determining the keyword evaluation $K_w$ in the order in which larger keyword evaluation is given priority in determination. The keyword evaluation can be calculated by Equation 2.

$$K_w = \Sigma max\,((E_i - F_w),\, 0) w \in S_i \quad (2)$$

where $S_i$ is a character string included in a BUNSETSU "i", and $F_w$ expresses a general frequency of the word "w".

Table 1 shows a list obtained by extracting keywords from a document explaining "air-conditioner using neural network" and arranging the keywords in the order in which larger keyword evaluation $K_w$ is given priority in arrangement. As apparent by Table 1, the keyword extraction method of the present invention can extract keywords such as "快適(comfortable)", "エアコン(air-conditioner)", "認識(recognition)" and "ニューラル(neutral)" and "学習(learning)" which are suitable for a document on air-conditioners using neural network.

TABLE 1

| keyword | keyword evaluation Kw |
|---|---|
| 快適 (comfortable) | 1893 |
| エアコン (air-conditioner) | 1849 |
| 認識 (recognition) | 1624 |
| ニューラル (neural) | 1535 |
| 学習 (learing) | 1518 |
| . | . |
| . | . |
| . | . |
| もの (which) | 0 |
| こと (what) | 0 |

Utilization of only the word's frequency information of a document provides extracted words such as "もの (which)" and "こと(what)", while the keyword extraction method of the present invention does not extract as keywords such words as "もの (which)" and "こと(what)" which appear at a high frequency even in general documents, but can extract as keywords only words expressing the document content. Further, the method makes it possible to extract keywords from a character string which has many character candidates and discloses errors as a result of character recognition for a document image.

Figure 2:
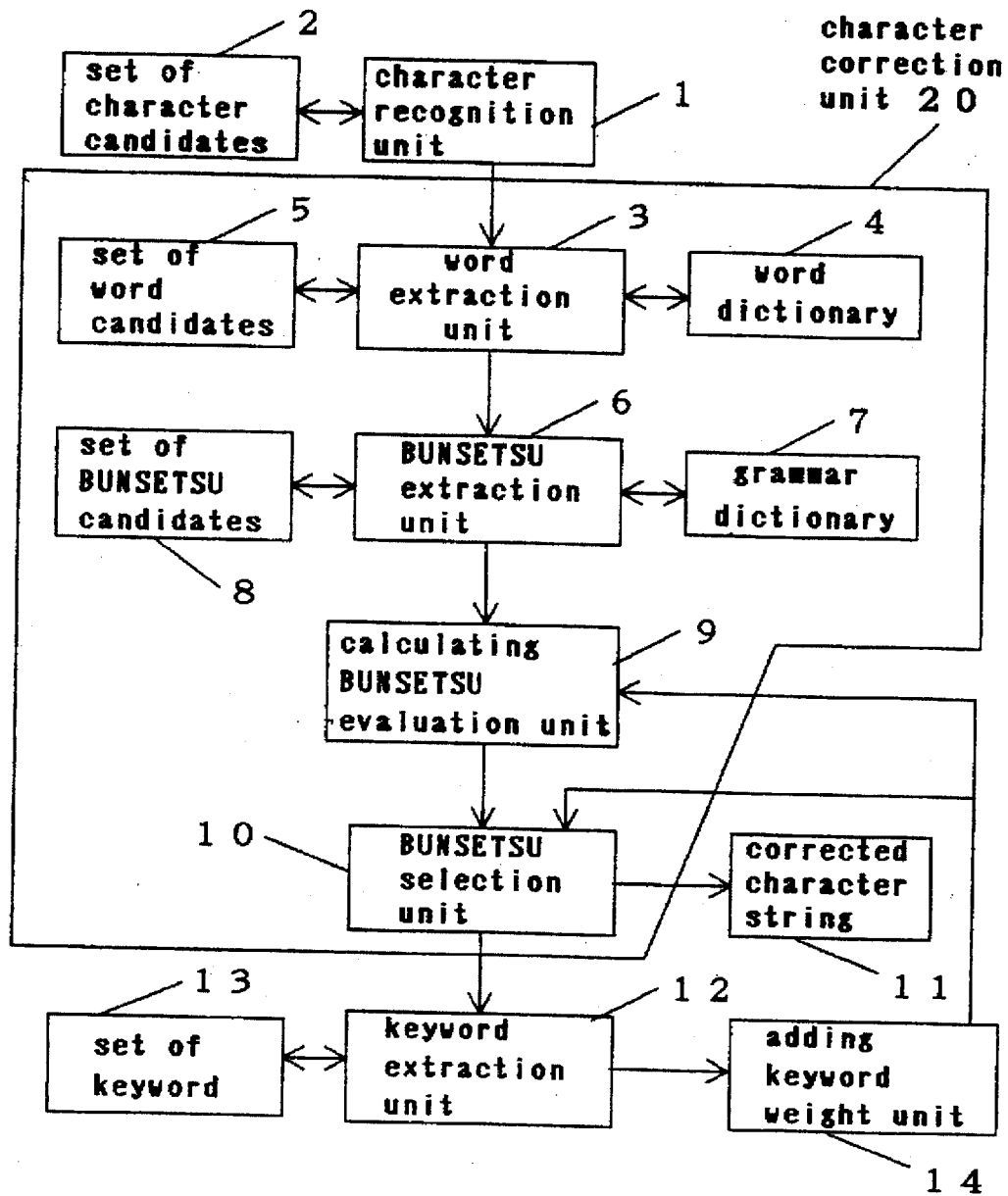
FIG. 2 is a block diagram of a character recognition apparatus of a second embodiment according to the present invention.

An embodiment of a second invention of the present invention will be explained hereinafter. FIG. 2 shows a composition of a character recognition apparatus of the embodiment.

The character recognition unit 1, the word extraction unit 3, the BUNSETSU extraction unit 6, the BUNSETSU evaluation unit 9, the BUNSETSU selection unit 10 and the keyword extraction unit 12 are the same as those of the first embodiment. A character correction unit 20 comprises the word extraction unit 3, the BUNSETSU extraction unit 6, the BUNSETSU evaluation unit 9, the BUNSETSU selection unit 10, the word dictionary 4, the grammar dictionary 7 and the like.

By adding keyword weight unit 14, if keywords exist in a BUNSETSU, the BUNSETSU evaluation unit 9 and BUNSETSU selection unit 10 improve BUNSETSU evaluation E according to Equation 3 (which follows). The keywords which reveal the subject matter of a document increases the BUNSETSU evaluation accuracy of the BUNSETSU candidates which include the keyword. This allows correction enhancement by using the subject matter of a document.

Now, an order is determined by a value of a keyword "$K_w$", thereby determining a value to be added according to the order.

$$E = E + \Sigma e\, E_{key,i} \quad i \in K \quad (3)$$

where E=BUNSETSU evaluation
$E_{key}$=added value according to the keyword order
K=keyword included in BUNSETSU
e=constant In the character recognition apparatus having the above composition, the character recognition is performed as follows.

First, a document to be recognized is processed in the character recognition unit 1 to obtain a set of character candidates 2. Then, the word extraction unit 3 selects a combination of character candidates accordant with words existing in the word dictionary 4. The BUNSETSU extraction unit 6 selects a combination of words (BUNSETSU candidates) capable of becoming a BUNSETSU by referring to the grammar dictionary 7. The BUNSETSU evaluation unit 9 calculates an evaluation of the BUNSETSU candidates extracted in the BUNSETSU extraction unit 6. The BUNSETSU selection unit 10 selects a correct BUNSETSU among BUNSETSU candidates based on the evaluation to output the corrected character string 11. The keyword extraction unit 12 calculates the keyword evaluation $K_w$ in a manner as with the first embodiment.

Then, the adding keyword weight unit 14 makes the BUNSETSU evaluation unit 9 or the BUNSETSU selection unit 10 enhance BUNSETSU evaluation E according to Equation 3 by using the output of the keyword extraction unit 12. For example, the calculating BUNSETSU evaluation unit 9 recalculates the BUNSETSU evaluation of the BUNSETSU (Equation 3) with the keyword evaluation $K_w$. Then BUNSETSU selection unit 10 selects a BUNSETSU having a higher probability evaluation among BUNSETSU candidates to output the corrected character string 11.

FIG. 3 shows part of results of the character recognition performed by this embodiment. An output from a character correction unit 20 is taken as a 1-pass (first pass) recognition result. Table 1 shows the list of keyword information determined from that result. Further, a result of character correction performed using the keyword information is a 2-pass (second pass) recognition result. In FIG. 3, seven BUNSETSUs were extracted as BUNSETSU candidates for an original character string of "現場学習機能(scene learning function)". Then a BUNSETSU of "学習(learning)" was not selected in the 1-pass recognition result, but the word of "学習(learning)" was included in the keyword information so that the evaluation of the BUNSETSU of "学習(learning)" was enlarged in the 2-pass recognition result, and characters were properly corrected. Thus, even when both the 1-pass recognition result and the 2-pass recognition result are correct with respect to vocabulary and grammar, using the keyword information allows a corrected character string appropriate for the content of a document to be selected. Although in this embodiment, a 2-pass recognition was performed such that keywords were extracted from the character string processed in the first pass in character correction unit 20 and then the character string is processed again in the character correction unit 20 using the previously extracted keywords, additional passes recognition may be performed such that keywords are further extracted using the recognition result, and then the character string is processed once or more in the character correction unit 20 in which case, a more correct keyword is obtained, thereby improving the recognition rate.

In an experiment of character recognition using this embodiment, the use of the keyword information for a document having 874 characters allowed four misrecognized character strings to be corrected. Further, an application to longer documents would enhance the effectiveness of keyword information use.

As shown in this embodiment, a character string is processed in the character correction unit 20, and then, based on the character string 11 obtained, keyword information is extracted. Character correction is then performed using this keyword information, whereby the evaluation of BUNSETSU selection varies depending on the document's content, thereby allowing the recognition rate of character recognition to be improved.

Figure 4:
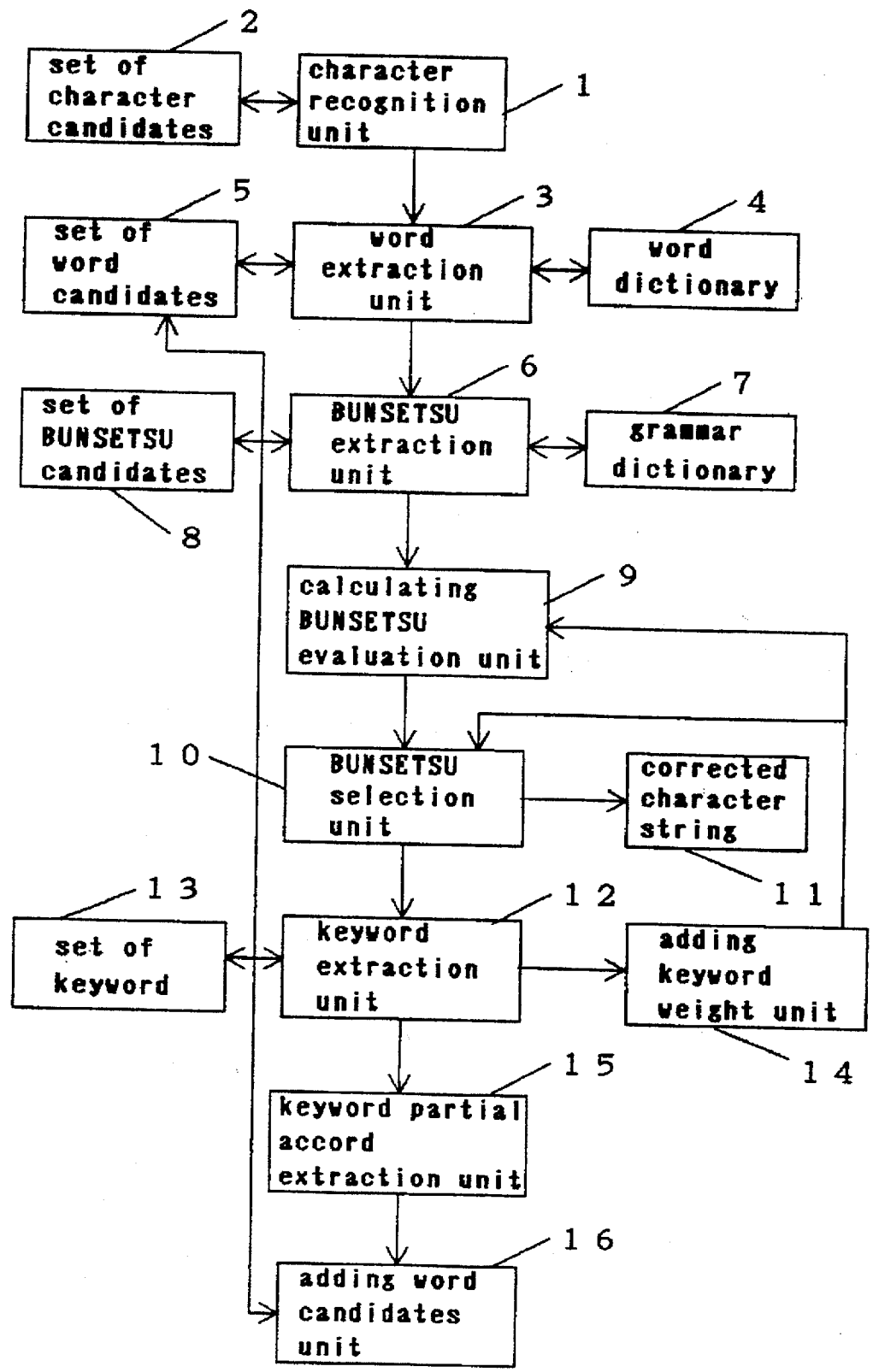
FIG. 4 is a block diagram of a character recognition apparatus of a third embodiment according to the present invention.

A third embodiment of the present invention will be explained hereinafter. FIG. 4 shows a composition of a post processing for character recognition of the embodiment.

The character recognition unit 1, the word extraction unit 3, the BUNSETSU extraction unit 6, the BUNSETSU evaluation unit 9, the BUNSETSU selection unit 10, the keyword extraction unit 12 and the adding keyword weight unit 14 are the same as those of the second embodiment.

A keyword partial accord extraction unit 15 extracts words from a set of character string candidates partially accordant with obtained keywords. For example, if "認識(recognition)" is extracted as a keyword, "認*" and "*識" in the character string candidates are extracted as partially accordant characters. Here "*" means any character.

An adding word candidates unit 16 adds the partially accordant keywords to the set of word candidates 5, while corresponding to said character positions.

In, the above example, "認識(recognition)" is added to the character positions of the set of word candidates 5, while the positions correspond to the partially accordant "認殺" and "記識". This allows characters not output from the character recognition unit 1 to be entered into the character candidate list 5. This uses keywords showing the meaning of document, thereby allowing processing according to the meaning of document.

An operation of the postprocesssing for character recognition having the above composition will be described.

First, the character recognition unit 1 processes a document of recognition object to obtain a set of character candidates 2. Then, the word extraction unit 3 extracts a combination of character candidates accordant with words existing in the word dictionary 4, while responding to the character positions, and the BUNSETSU extraction unit 6 extracts a combination of words capable of becoming a BUNSETSU by referring to the grammar dictionary 7, while responding to the character positions. The BUNSETSU evaluation unit 9 calculates an evaluation of the BUNSETSU extracted in the BUNSETSU extraction unit 6. The BUNSETSU selection unit 10 selects a correct BUNSETSU among BUNSETSU candidates based on the evaluation to output the corrected character string 11 at the 1-pass.

The keyword extraction unit 12 calculates the keyword evaluation Kw to extract keywords.

The keyword partial accord extraction unit 15 extracts words in the set of character candidates 2 partially accordant with the obtained keywords. In order to make a calculating volume smaller, as the set of character candidates 2, a higher order character from the character recognition unit 1, for example, only the first order may be taken as a candidate set. This raises no problem if the character recognition unit 1 has a higher recognition rate.

Then, the adding word candidates unit 16 adds the obtained words to a set of word candidates 5, while responding to the character positions. At this point, the character's reliability evaluation $E_a$ of the added character should desirably be given a lowest reliability evaluation. In the above example, the "殺" is corrected to the "識", and the "記" is corrected to the "認". And the reliability evaluations of the new "識" and "認" are lowest.

Key words up to tenth order should desirably be used. However, for a longer document, more keywords should preferably be used.

The calculating BUNSETSU evaluation unit 9 evaluates again a BUNSETSU evaluation of added word candidates 5.

Then, the adding keyword weight unit 14 modifies the BUNSETSU evaluation of Equation 3 according to the meaning of a document.

Finally, the BUNSETSU selection unit 10 selects a BUNSETSU having a large evaluation among BUNSETSU candidates to output the final corrected character string 11 at the 2-pass.

Figure 5:
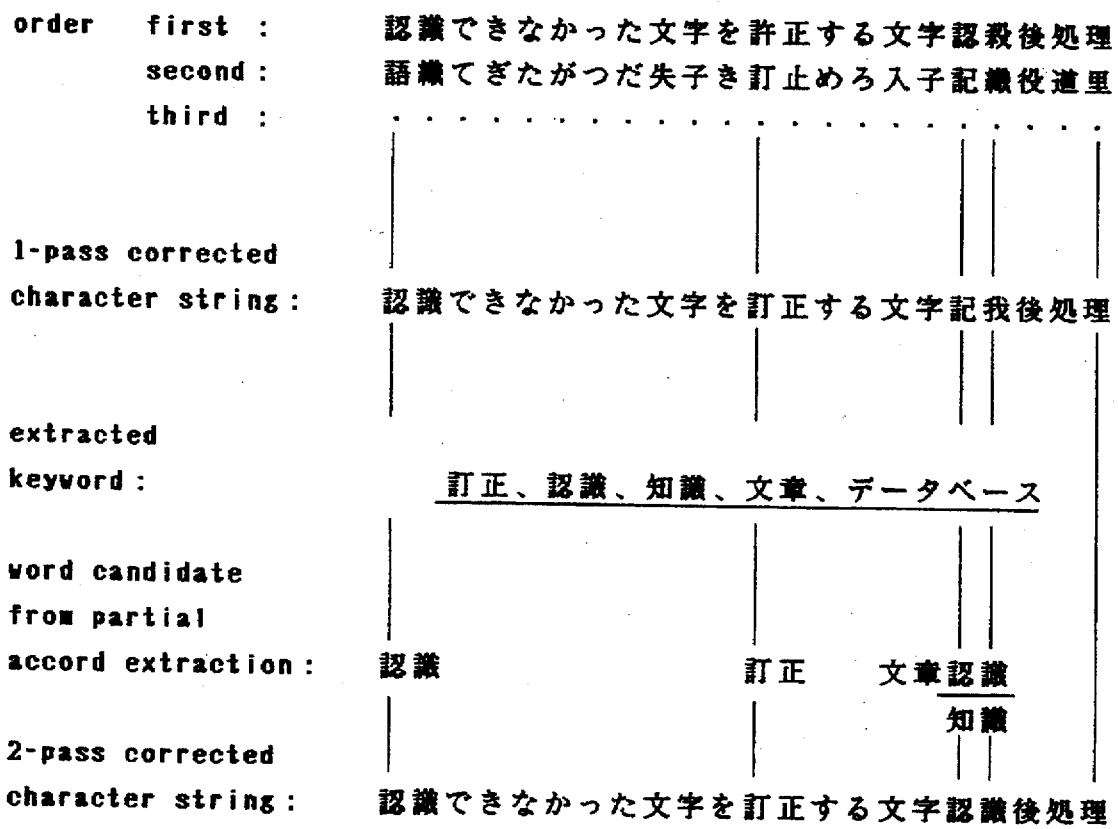
FIG. 5 is a an output view experiment result showing an effect of a keyword partial accord extraction unit and an adding word candidates unit according to the present invention.
Figure 6:
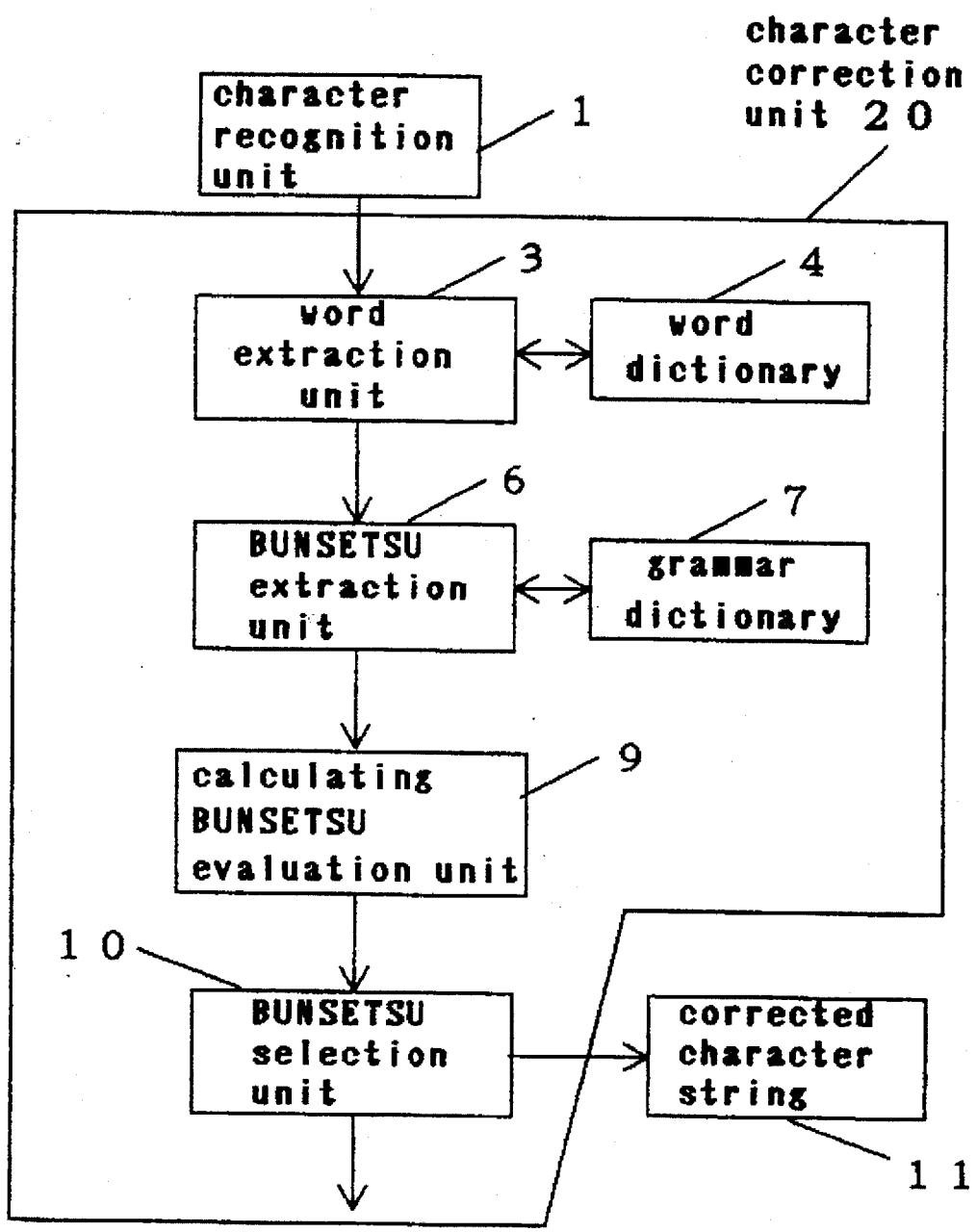
FIG. 6 is a block diagram of a conventional postprocesssing for character recognition.

FIG. 3 and FIG. 5 show part of results obtained by performing a character recognition by this embodiment.

FIG. 5 shows results obtained by applying this embodiment to a sentence expressing a content of "character recognition processing effect", and shows an effect of the keyword partial accord extraction unit 15 and the adding word candidates unit 16 by the use of the results. As the output from the character recognition unit 1, "認殺" is output and the "認識" is not output in the character candidates. Accordingly, by a conventional method, correct words "認識" would not be entered by postprosessing procedure. On the other hand, the present method can extract keywords "訂正", "認識", "知識", "文章" ..., based on the meaning of a sentence as shown in FIG. 5, whereby "認識", etc. can be entered in the character candidates by the use of the keyword partial accord extraction. Thus, after the correction of the character string at the 2-pass, a correct sentence can be obtained.

Further, although in this embodiment, the character's reliability $E_a$ of the added character is given a lowest reliability, the extracted characters may be supplied to the character recognition unit 1 which recalculates a new evaluation $E_a$ for the added characters to obtain the evaluation $E_a$. This allows a more correct evaluation.

Using the present invention allows keywords to be added automatically to a document, thereby making it possible to achieve the document's data base and extract words in the document.

Also, the present invention is applicable not only to the character recognition of Japanese sentences, but to that of English and other foreign languages sentences.

Further, although in the above embodiments, one corrected character string 11 is output at the 1-pass or 2-pass from the BUNSETSU selection unit 10, a plurality of corrected character strings may be output.

As apparent by the above embodiments, the use of a character recognition apparatus having a composition according to the present invention makes it possible to extract keywords suitable for a document from character strings including errors as found in results of the conventional character recognition of a document image.

Further, the addition of the keyword evaluation $K_w$ to a BUNSETSU evaluation provides a character recognition based on the content of a document being recognized. Accordingly, the recognition rate is improved, thereby providing a better practical effect.

Further, even where there is no correct character in the character candidates from the character recognition unit, character candidates can be added by the partial accord extraction of keywords, thereby improving the recognition rate.

Still further, the use of the composition of the present invention allows keywords to be added automatically to a document, thereby making it possible to achieve the document's data base and extract words in the document.

What is claimed is:

1. A character recognition apparatus comprising:

a character recognition unit for scanning a document and outputting character candidates corresponding to the characters in a scanned line of characters of the document;

a correct character string selection unit for selecting a character string from character candidates output from said character recognition unit to provide a selected character string including plural word candidates, said string selection unit selecting a character string such that word candidates within the string are consistent with a vocabulary dictionary and a grammar dictionary; and a keyword extraction unit for extracting keywords from a character string selected by said correct character selection unit based on occurrence of a certain word in the subject matter of the document scanned by said character recognition unit, wherein said keyword extraction unit extracts a keyword according to both the frequency of appearance of the certain word in a character string selected by said selection unit and the frequency of appearance of the certain word in sentences within the document.

2. A character recognition apparatus comprising:

a character recognition unit for scanning a document and outputting character candidates corresponding to the characters in a scanned line of characters of the document;

a correct character string selection unit for selecting a character string from character candidates output from said character recognition unit to provide a selected character string including plural word candidates, said string selection unit selecting a character string such that word candidates within the string are consistent with a vocabulary dictionary and a grammar dictionary;

a keyword extraction unit for extracting keywords from a character string selected by said correct character selection unit based on occurrence of a certain word in the subject matter of the document scanned by said character recognition unit;

a BUNSETSU extraction unit for selecting BUNSETSU candidates from among a character string selected by said correct character string selection unit, and a BUNSETSU evaluation unit for evaluating BUNSETSU selected by said BUNSETSU extraction unit from within a character string selected by said selection unit, and wherein when the document contains Japanese language characters, said BUNSETSU evaluation unit utilizes a keyword output from said keyword extraction unit in evaluating a BUNSETSU candidate selected by said BUNSETSU extraction unit.

3. A character recognition apparatus comprising:

a character recognition unit for scanning a document containing Japanese language characters and outputting character candidates corresponding to the characters in a scanned line of characters in the document;

a word extraction unit for determining a set of word candidates from said character candidates which word candidates are consistent with a word dictionary;

a BUNSETSU extraction unit for determining BUNSETSU candidates from said set of word candidates which BUNSETSU candidates are consistent with a grammar dictionary;

a BUNSETSU evaluation unit for evaluating BUNSETSU candidates determined by said BUNSETSU extraction unit based on grammatical and contextual correctness of said BUNSETSU candidates and outputting evaluated BUNSETSU candidates;

a BUNSETSU selection unit for selecting from among evaluated BUNSETSU candidates output from said BUNSETSU evaluation unit and outputting at least one corrected character string;

a keyword extraction unit for extracting keywords from a corrected character string output from said BUNSETSU selection unit, said keyword extraction unit extracting keywords based on the subject matter content of the document scanned by said character recognition unit;

a partial keyword accord unit for providing additional keywords which are partially accordant with said keywords extracted by said keyword extraction unit; and a word candidate adding unit for adding partially accordant words provided by said partial keyword accord unit to said keywords extracted by said keyword extraction unit.

4. A character recognition apparatus in accordance with claim 3, further comprising:

a keyword weight adding unit for enhancing evaluation of a BUNSETSU candidate when said keyword extraction unit has extracted a keyword from said BUNSETSU selection unit.

5. A character recognition apparatus in accordance with claim 1, wherein, when said document contains Japanese characters, said correct character string selection unit selects its selected character string by performing phrase evaluation to determine grammatical and contextual correctness, and wherein phrase evaluation by said correct character string selection unit involves keyword output from said keyword extraction unit.

6. A character recognition apparatus comprising:

a character recognition unit for scanning a document containing Japanese characters and outputting character candidates corresponding to the characters in a scanned line of characters of the document;

a word extraction unit for determining a set of word candidates form said character candidates which word candidates are consistent with a word dictionary;

a phrase extraction unit for determining phrase candidates from said set of word candidates which phrase candidates are consistent with a grammar dictionary;

a phrase evaluation unit for evaluating said phrase candidates based on said grammatical and contextual correctness of said phrase candidates and outputting evaluated phrase candidates;

a phrase selection unit for selecting among evaluated phrase candidates output from said phrase evaluation unit and outputting at least one corrected character string;

a keyword extraction unit for extracting keywords from corrected character string output from said phrase selection unit, said keyword extraction unit extracting keywords based on the subject matter of the document scanned by said character recognition unit;

a partial keyword accord unit for providing additional keywords which are partially accordant with said keywords extracted by said keyword extraction unit; and a word candidate adding unit for adding said partially accordant words provided by said partial keyword accord unit to said keywords extracted by said keyword extraction unit.

7. A character recognition apparatus in accordance with claim 6, further comprising:

a keyboard weight adding unit for enhancing evaluation of a phrase candidate when said keyword extraction unit has extracted a keyword from said phrase selection unit.

* * * * *

UNITED STATES PATENT AND TRADEMARK OFFICE
CERTIFICATE OF CORRECTION

PATENT NO. : 5,689,583
DATED : November 18, 1997
INVENTOR(S) : Niwa, et al.

It is certified that error appears in the above-indentified patent and that said Letters Patent is hereby corrected as shown below:

Col. 3, line 46, change "ニュ-ル (neutral)" to --ニュ-ラル (neural)--;

Col. 3, within TABLE 1, between lines 55 and 60, change "ニュ-ル (neural)" to --ニュ-ラル (neural)--;

Col. 3, within TABLE 1, between lines 60 and 61, change "てと (what)" to --こと (what)--;

Col. 3, line 67 (last line), change "てと (what)" to --こと (what)--;

Col. 4, line 2, change "てと (what)" to --こと (what)--; and

Col. 10, claim 7, line 3 of the claim, change "a keyboard" to --a keyword--.

Signed and Sealed this

Seventh Day of April, 1998

Attest:

BRUCE LEHMAN

*Attesting Officer*       *Commissioner of Patents and Trademarks*